Feb. 21, 1933.  W. L. ZINK  1,898,113
SAFETY DEVICE FOR POWER TAKE-OFF SHAFTS
Filed Jan. 25, 1932
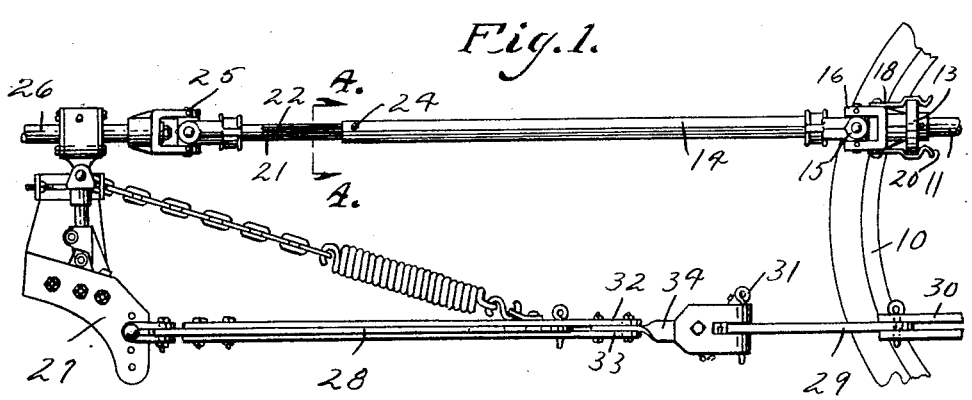
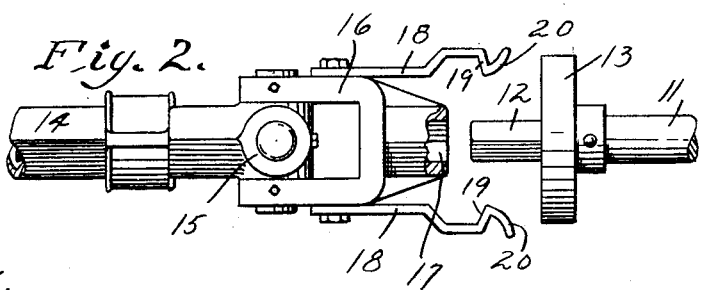
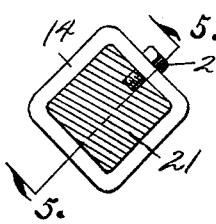
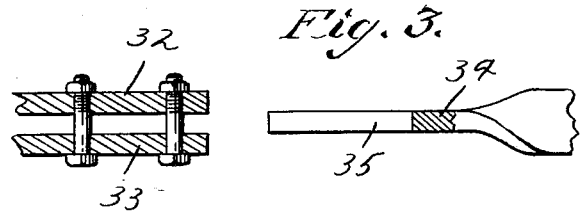
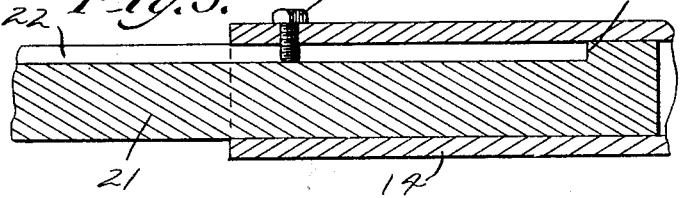
Inventor
W. L. Zink Patented Feb. 21, 1933

1,898,113

UNITED STATES PATENT OFFICE

WILLIAM L. ZINK, OF AURORA, ILLINOIS

SAFETY DEVICE FOR POWER-TAKE-OFF SHAFTS

Application filed January 25, 1932. Serial No. 588,801.

In connection with the use of tractor drawn plows and the like, it is customary to provide a draw bar connection between the two implements, so arranged that when, for instance, the plow should strike a heavy obstruction, or for various other reasons, the draw bar will disconnect from the tractor to prevent injury to the implements.

When a pulverizer attachment is used on the plow, such for instance as that disclosed in the patent to Davidson, Number 1,697,679, issued January 1, 1929, then it is necessary to provide a connection between the power-take-off of the tractor and the power shaft of the pulverizer attachment through which power can be transmitted from the tractor to the pulverizer, and obviously there must be means for permitting this power shaft connection to become separated just like the draw bar when the plow meets a heavy obstruction.

Heretofore with devices of this kind it has been found that when the power shaft connection becomes separated, the end thereof adjacent to the tractor will, when the power-take-off is rotated, move to a position substantially at right angles to the power-take-off shaft on account of centrifugal action and rapidly whirl about and injure the mechanism or an operator.

The object of my invention is to provide a power-take-off device for use in transmitting power from a tractor to an implement such as a pulverizer attachment for plows, so arranged that when the draw bar between the plow and the tractor becomes separated, all that portion of the power shaft in the rear of the front universal universal joint thereof will become disconnected from the power-take-off shaft and be carried by the driven implement, so that in the event that the power-take-off shaft should continue to rotate after the draw bar has been disconnected, it would not have any injurious effects.

My invention consists in the construction, arrangement and combination of the various parts of the device, whereby the objects contemplated are attained, as hereinafter more fully set forth, pointed out in my claims, and illustrated in the accompanying drawing, in which:

Figure 1 shows a side elevation of portions of a tractor and an implement such as a plow with a draw bar connection and a power-take-off device embodying my invention.

Figure 2 shows an enlarged, detail, side elevation illustrating a portion of the power-take-off shaft, the forward universal joint and a portion of the slip tube connected with the universal joint, and illustrating my improved spring release device for permitting a separation between the power-take-off shaft and the forward universal joint.

Figure 3 shows an enlarged, detail, sectional view illustrating the adjacent ends of the friction release means between the forward and rear portions of the draw bar.

Figure 4 shows a sectional view on the line 4—4 of Figure 1; and

Figure 5 shows a sectional view on the line 5—5 of Figure 4.

Referring to the accompanying drawing I have used the reference numeral 10 to indicate that portion of a tractor shown. This tractor is provided with a power-take-off shaft 11, the rear end of which is preferably squared at 12 and in front of the squared portion there is fixed a collar 13. The slip tube 14 of the power shaft is provided at its forward end with a universal joint member 15 and a coacting universal joint member 16 is connected with it in the ordinary manner. At the forward end of the universal joint member 16 is a socket 17 having a squared interior to slidingly and non-rotatively receive the squared portion 12 of the power shaft.

Carried by the universal joint member 16 are two spring retaining arms, indicated generally by the numeral 18. Near the forward ends thereof are the inwardly and slightly forwardly inclined shoulders 19, and at the forward ends thereof are the outwardly and forwardly inclined shoulders 20.

In operation with this part of the device, when the universal joint member 16 is moved forwardly, the squared portion 12 enters the squared socket 17, and at the same time the inclined shoulders 20 are forced apart by the collar 13 until the collar is in the rear of the inclined shoulders 19, whereupon these arms 18 spring together and frictionally hold the collar within the spring arms against separating movement, except when excessive strain in a rearward direction is applied to the slip tube, and when this occurs, the pressure of the collar against the inclined shoulders 19 causes the spring arms to separate.

Slidingly inserted in the rear end of the slip tube is an angular slip shaft 21 formed with a longitudinal groove 22, which groove terminates at its forward end a short distance in the rear of the front end of the slip shaft, forming a shoulder 23. After the slip shaft is inserted in the slip tube, I insert a set screw 24 through the slip tube and into the groove 22, thus permitting a free movement of the slip tube within the slip shaft, which movement, however, is limited to prevent the complete withdrawal of the slip shaft from the slip tube.

At the rear of the slip shaft is a universal joint 25, and at the rear of this universal joint is the power shaft 26 for the pulverizer attachment or other implement to be driven. The plow or other implement is provided at its forward end with a clevis 27, and pivotally connected to this clevis is a draw bar member 28 to connect with a draw bar member 29 pivoted to a portion of the tractor 30. The two portions of the draw bar are connected by a hitch pin 31 and the draw bar is provided with a friction joint, which consists of two members 32 and 33, spaced apart and provided with bolts for drawing them together, and a member 34 having a slot 35 and designed to be inserted between the members 32 and 33 and to be frictionally secured therein by said bolts.

In practical operation, and assuming that the implement being drawn by the tractor should strike a heavy obstruction, then the two members of the draw bar will separate in the ordinary manner, and when this is done, then the entire strain of the tractor will be thrown upon the slip tube, after the limit of the movement between the slip tube and the slip shaft has been reached. When this heavy strain is thus applied to the slip tube, then the inclined shoulders 19 of the spring retaining arms will be caused to separate enough to permit the arms 18 to spring apart far enough to clear the collar 13, whereupon the entire slip tube and slip shaft device will drop away from the power-take-off shaft, and hence even if the power-take-off shaft should continue to rotate, there will be no injurious effects.

I claim as my invention:

1. In a device of the class described, the combination of a power-take-off shaft, a slip tube and a slip shaft slidingly connected, means for limiting the movement of the slip shaft out of the slip tube, a universal joint at the forward end of the slip tube, and means operated by an excessive pull upon the slip tube to disconnect it from the power shaft, said means comprising a squared socket formed on the forward end of the universal joint, a squared rear end portion on the power-take-off shaft to enter said socket, a collar fixed to the power-take-off shaft, and spring retaining arms fixed to the universal joint to engage the said collar and normally hold it against separating movement relative to the spring arms, said spring arms being so shaped that excessive pull applied to the slip tube will permit the spring arms to separate and release the collar.

2. In a safety device for power take off shafts, the combination of a power take off shaft, a driven shaft, a universal joint at the forward end of the driven shaft, the adjacent ends of said shafts being slidingly and non-rotatably connected whereby when connected the driven shaft may be rotated by the power shaft, and when the driven shaft is moved rearwardly it will be disconnected from the power shaft, and a two part spring latching device, one part carried by the power shaft and the other by the driven shaft, said spring latching device including shoulders for normally gripping the other latch member and for releasing it upon an excessive pull rearwardly upon the driven shaft.

Des Moines, Iowa, December 17, 1931.

WILLIAM L. ZINK.